(12) United States Patent
Cruze

(10) Patent No.: US 7,364,318 B1
(45) Date of Patent: Apr. 29, 2008

(54) ILLUMINATION CHAMBER

(76) Inventor: Tony Cruze, 1454 SW. 15th St., Willmar, MN (US) 56201

( * ) Notice: Subject to any disclaimer, the term of this patent is extended or adjusted under 35 U.S.C. 154(b) by 148 days.

(21) Appl. No.: 11/353,461

(22) Filed: Feb. 14, 2006

Related U.S. Application Data

(60) Provisional application No. 60/653,591, filed on Feb. 16, 2005.

(51) Int. Cl.
*F21V 33/00* (2006.01)
(52) U.S. Cl. .................................................. 362/154
(58) Field of Classification Search ................ 362/154; 43/17.5
See application file for complete search history.

(56) References Cited

U.S. PATENT DOCUMENTS

| | | | |
|---|---|---|---|
| 4,020,580 A | * | 5/1977 | Chappell et al. ............. 43/17.5 |
| 5,311,413 A | * | 5/1994 | Farmer et al. .............. 362/154 |
| 5,388,039 A | | 2/1995 | Dolph |
| 6,041,919 A | * | 3/2000 | Adams ...................... 206/15.3 |

* cited by examiner

*Primary Examiner*—Sandra O'Shea
*Assistant Examiner*—James W Cranson
(74) *Attorney, Agent, or Firm*—Patterson, Thuente, Skaar & Christensen, PA

(57) ABSTRACT

An illumination chamber for activating a photoluminous object includes a chamber assembly defining an interior, substantially fully enclosable chamber defined by a chamber assembly inner margin, the chamber assembly including an illuminator port opening into the chamber and a substantially sealable object port opening into the chamber, the object port having a hingedly shiftable lid, the lid presenting an inner margin defining in part the chamber when in a closed disposition, and the chamber assembly inner margin, including the lid inner margin, presenting a substantially contiguous reflective surface to the chamber, the reflective surface defining substantially the full chamber, exclusive of the illuminator port. A method of illumination of a photoluminous object is further included.

12 Claims, 4 Drawing Sheets

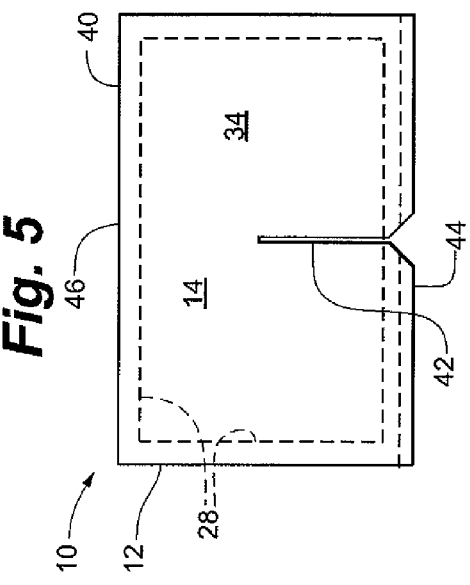
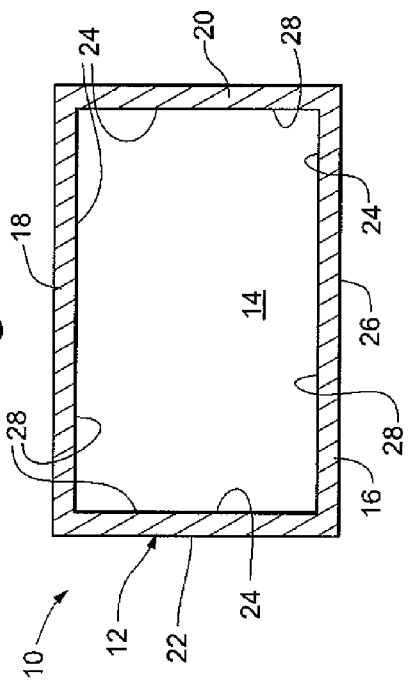
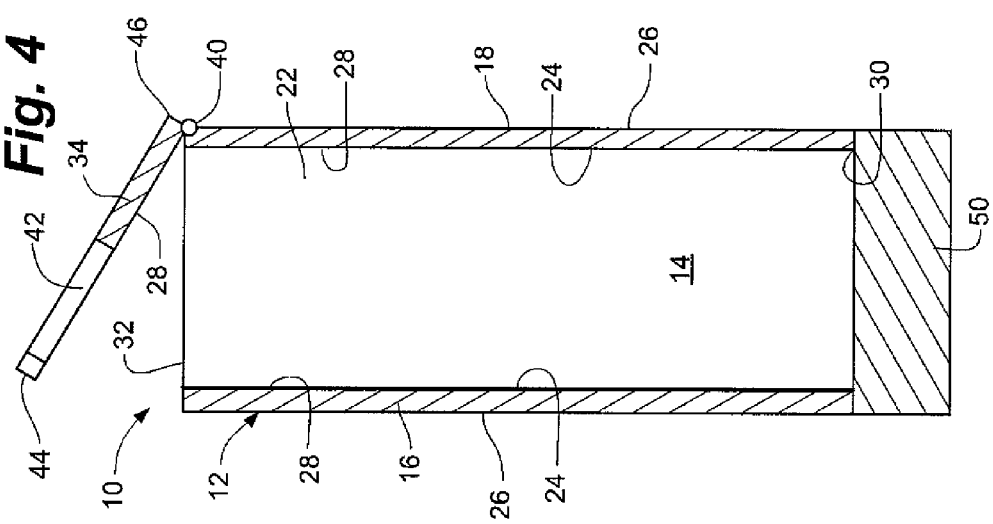

ILLUMINATION CHAMBER

RELATED APPLICATIONS

The present application claims the benefit of U.S. Provisional Application No. 60/653,591 entitled "Lightning Box," filed Feb. 16, 2005, which is incorporated herein by reference in its entirety.

FIELD OF THE INVENTION

The present invention relates to an apparatus and method for exciting luminous objects. More particularly, the present invention relates to a device and method for exciting a luminous fish attractor.

BACKGROUND OF THE INVENTION

Much sports fishing today is done at night or in low light conditions. It is commonly recognized that using fishing lures or other attractors that are provided with a phosphorescent or photoluminous (glow-in-the-dark) material enhances the possibility of attracting certain types of sport fish. As is well-known, the glow or illumination from such phosphorescent or photoluminous material can last for a relatively short period of time and must therefore be periodically reactivated. Such activation is generally provided by exposing the phosphorescent or photoluminous material to a relatively intense source of light.

Fishermen typically use incandescent light sources such as flashlights, vehicle headlights, or Coleman-type lanterns for reactivating the photoluminous material. Such reactivation has not proven very satisfactory in that reactivation by such light sources requires an undue period of time and the photoluminous material is not reactivated sufficiently to produce the level of luminosity which many fisherman desire and find useful.

Flash attachments from personal cameras have also been used to reactivate such photoluminous material. While the light from such device is intense, it is also designed to spread out, thereby requiring several illuminating flashes in order to achieve the desired level of luminosity of the lure. Multiple flashes from a flash attachment necessary to achieve the degree of luminosity desired also have the disadvantage of unduly discharging the battery that operates the flash attachment.

Other devices used to illuminate fishing lures, such as that depicted in U.S. Pat. No. 5,311,413 to Farmer et al., enable piling the objects in the bottom of a chamber. However, the piled objects in such devices can mask certain portions of some of the objects from the light and therefore create "shadows" or non-activated portions on the objects.

There is a need then in the industry for a device that can concentrate the light from a source on an object to be illuminated, such as a fishing lure, and achieve a satisfactory degree of luminosity in the object with a minimal amount of illumination from a light source.

SUMMARY OF THE INVENTION

The present invention substantially meets the aforementioned needs of the industry. The invention is designed to enhance the glow of a glow-in-the-dark item by a concentrated light reflection from a light source.

With the present invention, an object can be substantially enclosed in a sealed chamber in order to submerse it in light from any light source, be it natural or artificial. The chamber, exclusive of the illuminator port sealed by insertion of the light source, can be coated with a reflective material in order to concentrate the light on the object. Further, provisions are made to suspend the object in the chamber so that the maximum possible portion of the external margin of the object can be subjected to the light.

The chamber can come in any shape or size. The chamber can be spherical, rectangular, or other shape that can contain an object in order to concentrate light on the object, and use the light to its maximum ability. The chamber can be formed of any suitable material, including hard fiber board, plastics, and metals. With a metal chamber, the inner margin by be polished to provide the reflective properties needed.

The chamber can use any reflective materials including, but not limited to, different types of paint, metals, fabrics, or other material sufficient to reflect light.

The present invention can be used with light sources of any type to illuminate the item within. These light sources include all natural and artificial emitters of light. Low intensity sources of light include, but are not limited to, candles, lamps, or the sun. High intensity sources of light include, but are not limited to, lasers, flashlights, strobes, or camera flashes. The light source can be unmodified or modified through the use of any light magnification or concentration or any other item through which the light would be altered from its original state.

This present invention can be used to illuminate and activate any glow-in-the-dark item, including but not limiting to, stickers, decorations, safety devices, fishing lures of any size, bobbers of any size, gun sights, clothing, and any other potential glow-in-the-dark item. Its principal use will be to illuminate and activate glow-in-the-dark fishing lures and it is that use that is described below.

The present invention is an illumination chamber for activating a photoluminous object and includes a chamber assembly defining an interior, substantially fully enclosable chamber defined by a chamber assembly inner margin, the chamber assembly including an illuminator port opening into the chamber and a substantially sealable object port opening into the chamber, the object port having a hingedly shiftable lid, the lid presenting an inner margin defining in part the chamber when in a closed disposition, and the chamber assembly inner margin, including the lid inner margin, presenting a substantially contiguous reflective surface to the chamber, the reflective surface defining substantially the full chamber, exclusive of the illuminator port. The present invention is further a method of illumination of a photoluminous object is further included.

BRIEF DESCRIPTION OF THE DRAWINGS

FIG. 4 is a sectional view of the illumination chamber taken along section line A-A of FIG. 2;

FIG. 5 is a top plan view of an illumination chamber of FIG. 1;

FIG. 6 is a sectional view of an illumination chamber taken along section line B-B of FIG. 2.

DETAILED DESCRIPTION OF THE DRAWINGS

Figure 7:
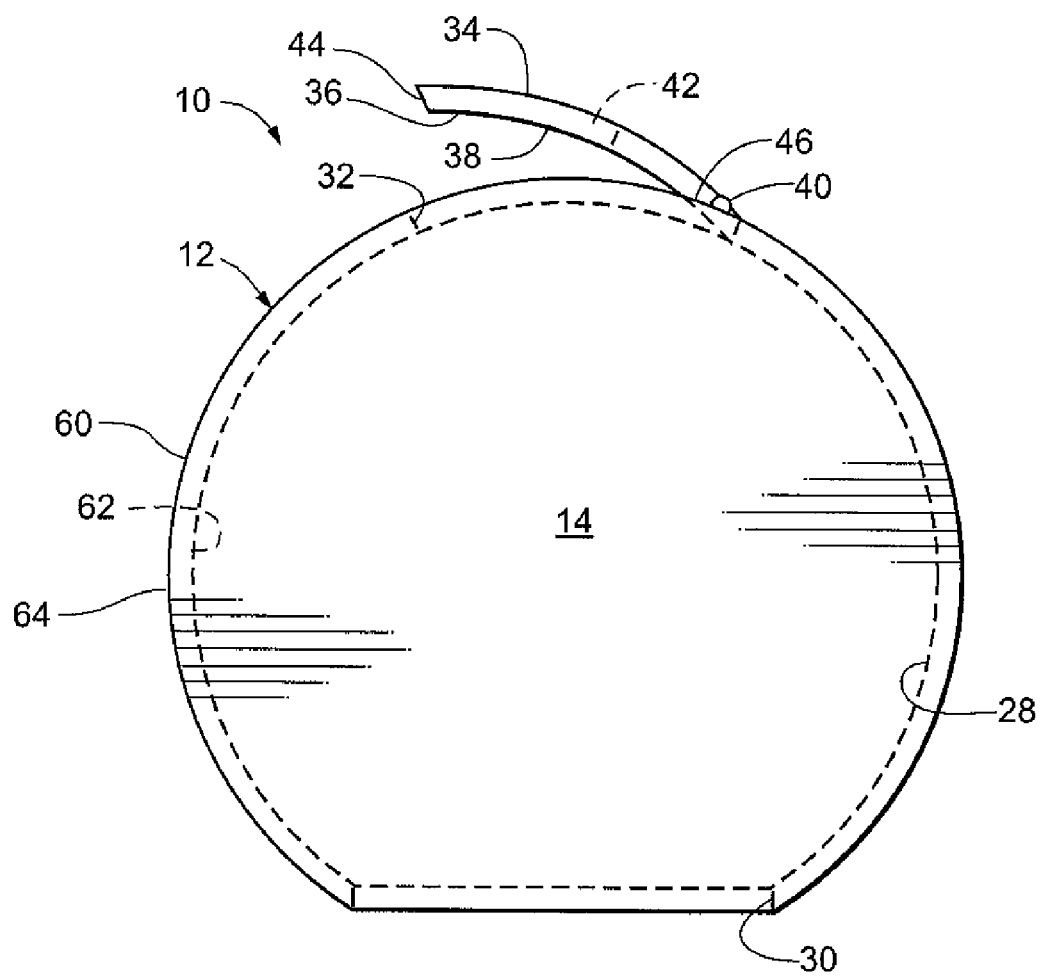
FIG. 7 is an elevational view of an illumination chamber according to a second embodiment of the present invention.

The illumination chamber of the present invention is shown generally at 10 in the figures. The illumination chamber 10 includes a chamber assembly 12 defining an interior chamber 14. The chamber assembly 12 described below can be generally formed of rectangular sides to define a box-like chamber assembly 12. It is understood that other shapes of the chamber assembly 12 can also be utilized. A spherical chamber assembly 12, as depicted in FIG. 7, can be particularly useful, as it is known that reflection in the interior of such a shape tends to concentrate the light energy at the origin of the sphere.

The chamber 14 can be defined in part by a front 16 and a back 18 and a pair of opposed sides 20 and 22. The front 16, back 18 and sides 20, 22 each present an inner margin 24 and an outer margin 26.

The inner margin 24 of the front 16, back 18 and sides 20, 22 presents a reflective surface 28 to the chamber 14. The reflective surface 28 can be integral to the formation of the front 16, back 18, and sides 20, 22. Alternatively, it can be a thin layer of reflective material that can be adhered to the inner margin 24 such as a metallic foil or fabric. The reflective surface 28 can also be formed by spraying a reflective material onto the inner margin 24. Other means of providing an inward direct reflective surface 28 are contemplated.

Figure 1:
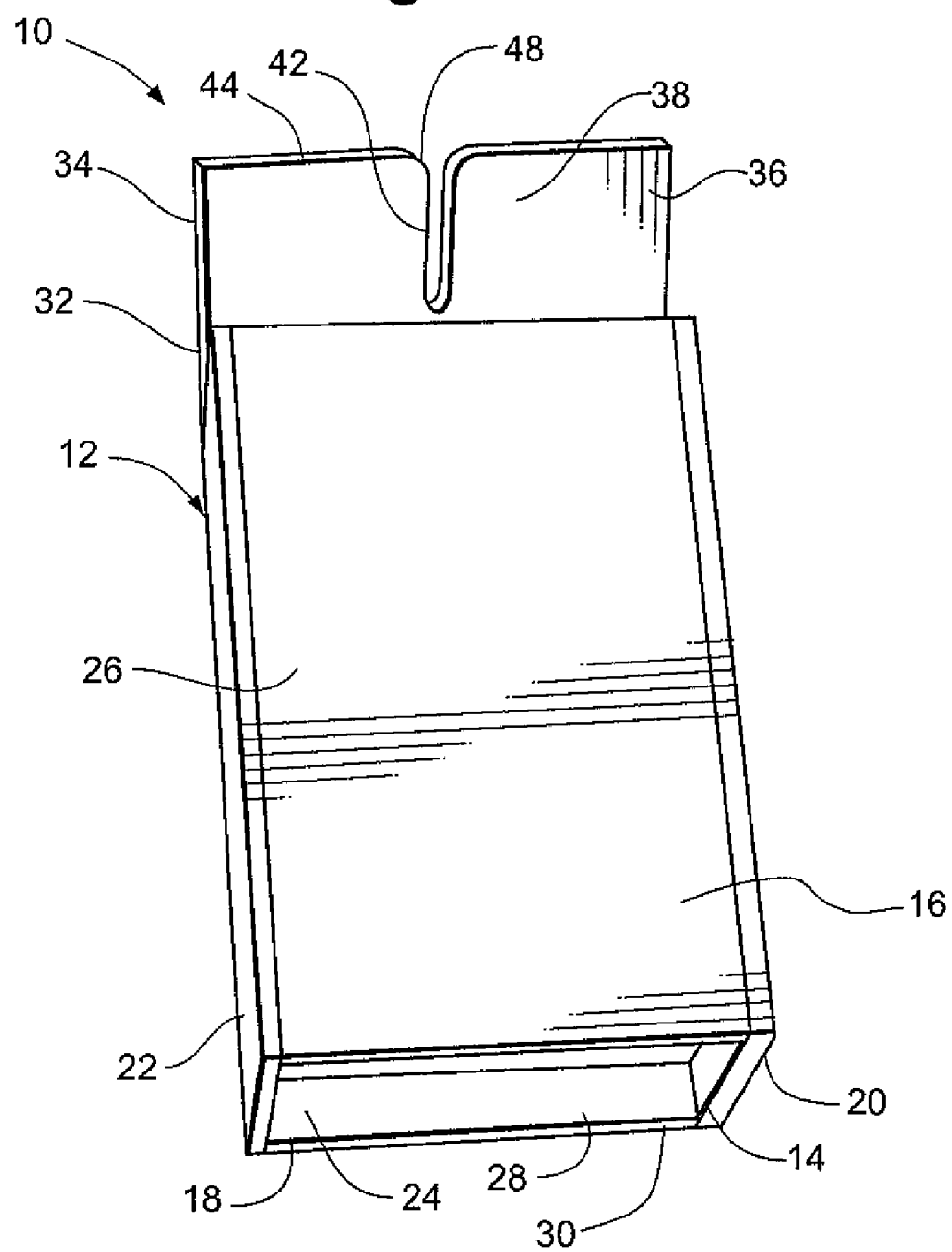
FIG. 1 is a perspective view of an illumination chamber according to a first embodiment of the present invention.
Figure 3:
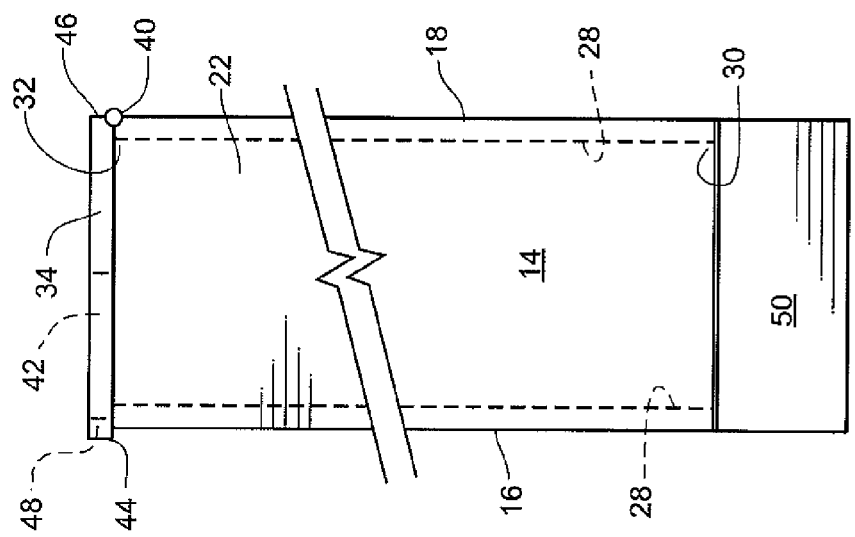
FIG. 3 is a side elevational view of an illumination chamber of FIG. 1.
Figure 2:
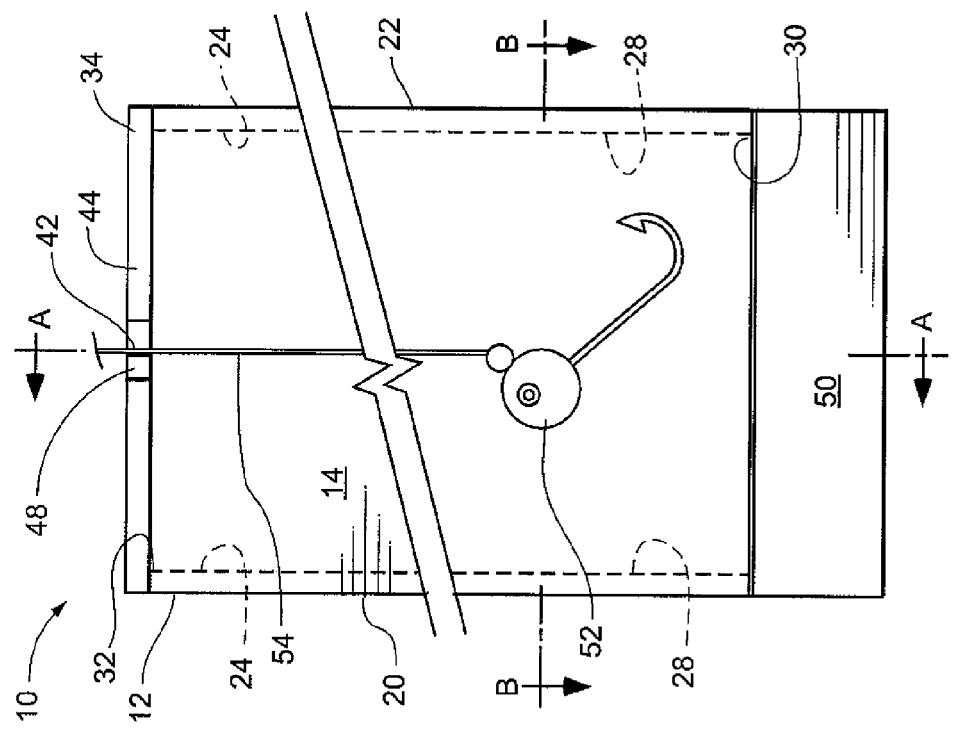
FIG. 2 is a front elevational view of the illumination chamber of FIG. 1.

A generally rectangular illuminator port 30 can be defined by a contiguous edge margin of the front 16, back 18, and sides 20, 22. The area and shape defined by the illuminator port 30 can be adapted to a particularly type of light source that is desired to be used with the illumination chamber 10 and in the present case is rectangular. Preferably, a light source 50 substantially closes off the illuminator port 30 when the light source 50 is abutted to the illuminator port 30 as depicted in FIGS. 2-4.

An object port 32 can be defined by the opposed contiguous edge margin of the front 16, back 18, and sides 20, 22. A shiftable port lid 34 can be provided to substantially close the object port 32. The port lid 34 has an inner margin 36. The inner margin 36 presents a reflective surface 38 to the chamber 14. Reflective surface 38 can be formed in a manner similar to that described above with reference to reflective surface 28. The port lid 34 can be shiftably coupled by a hinge 40. The hinge 40 can be preferably formed along the edge margin of the back 18.

The port lid 34 includes a slit 42. The slit 42 extends from the front margin 44 of the port lid 34 a distance approximately ½ the way to the back margin 46 of the port lid 34 to a position generally centrally located on port lid 34. The opening 48 at the front margin 44 of the slit 42 can be beveled as depicted in FIGS. 2, 4, and 5.

In operation, a light source 50 can be abutted to the illuminator port 30. An object 52 can be inserted into the chamber 14 through the object port 32. Preferably, the object 52 can be suspended from a slender line 54. The object 52 can be preferably suspended at a disposition that is approximately ½ the distance between the illuminator port 30 and the object port 32. The port lid 34 can be rotated about its hinge 40 to a closed disposition as depicted in FIGS. 2 and 3. The line 54 that is suspending the object 52 is passed through the beveled opening 48 and into the slit 42. With the port lid 34 closed and the light source 50 substantially closing the illuminator port 30, the chamber 14 can be substantially sealed from the outside sources of light. A reflective surface can be presented to the object 52 from each of the reflective surfaces 28 of the front 16, back 18, and sides 20, 22, as well as the reflective surface 38 of the port lid 34. An advantage where the object 52 is a fishing lure is that the lure can be pulled from the water, suspended in the chamber 14, reactivated by the light source 52 and promptly returned to the water.

In the aforedescribed disposition, the light source 50 can be triggered. Light from the light source 50 can be obliquely reflected from reflective surfaces 28, 38 (reflective surfaces generally presented on front 16, back 18, sides 20, 22, lid inner margin 36, and light source 50) toward the object 52. Light from the light source 50 can be directly reflected from the reflective material 38 toward the object 52. A single emission of light from the light source 50 has been shown to achieve a satisfactory degree of luminosity in the object 52.

In operation, object 52 can be guided into slit 42 by the beveling at opening 48. Because slit 42 can be approximately generally centrally located on the port lid 34, the object 52 can be guided into slit 42 and suspended at a disposition that can be approximately equidistant from front 16, back 18, and opposed sides 20, 22. In addition, object 52 can be suspended at a selected disposition between the illuminator port 30 and the object port 32. As a result, the configuration of slit 42 enables object 52 to become generally fully or completely bathed in the illumination and thus can become generally "shadow free" illuminated in one flash.

FIG. 7 depicts a spherical illumination chamber 10. The inner margin 62 in part defines the chamber 14. The inner margin 62 has a reflective surface 28, as described above. An illuminator port 30 can be disposed generally opposite an object port 32. A port lid 34 substantially seals the object port 32. The port lid has a slit 42 and the inner margin 36 presents a reflective surface 38. Operation of the spherical illumination chamber 10 is substantially as described above.

The above disclosure is not intended as limiting. Those skilled in the art will readily observe that numerous modifications and alterations of the device can be made while retaining the teachings of the invention. Accordingly, the above disclosure should be construed as limited only by the restrictions of the appended claims.

What is claimed is:

1. An illumination chamber for activating a photoluminous object, comprising:
    a chamber assembly defining an interior, substantially fully enclosable chamber defined by a chamber assembly inner margin, the chamber assembly including an illuminator port opening into the chamber and a substantially sealable object port opening into the chamber, the object port having a hingedly shiftable lid, the lid presenting an inner margin oriented into the chamber when in a closed disposition, the lid inner margin having a lid reflective surface presented thereon; and
    the chamber assembly inner margin, including the lid inner margin, presenting a substantially contiguous reflective surface to the chamber, the reflective surface defining substantially the full chamber.

2. The illumination chamber of claim 1, including the illuminator port being sized to accommodate a certain illuminator.

3. The illumination chamber of claim 1, including a slit being defined in the lid.

4. The illumination chamber of claim 3, including the slit being sized to enclose a line supporting the photoluminous object.

5. The illumination chamber of claim 3, including the slit having a slit opening at an edge margin of the lid.

6. The illumination chamber of claim 5, wherein the slit extends from the slit opening to a position generally centrally positioned on the lid.

7. The illumination chamber of claim 5, wherein the slit opening is generally beveled.

8. An illumination apparatus for activating a photoluminous object, the apparatus comprising:

an illumination chamber at least partially defined by a chamber inner margin, the illumination chamber including an illuminator operably coupled thereto and a generally opposed object port opening into the illumination chamber, the chamber inner margin presenting a substantially contiguous chamber reflective surface; and a lid operably coupled to the illumination chamber, such that the object port is operably enclosable by the lid, wherein a slit is presented on the lid and extends from a slit opening presented on an edge margin of the lid, the lid comprising a lid inner margin oriented into the chamber, the lid inner margin having a lid reflective surface presented thereon.

9. The apparatus of claim 8, wherein the slit extends from the edge margin to a substantially central position on the lid.

10. The chamber of claim 4, wherein the chamber reflective surface and lid reflective surface are selected from the group consisting of: a foil, a fabric, a polished metal, and a sprayable material.

11. The chamber of claim 8, wherein the illuminator is selected from the group consisting of: a candle, a lamp, a laser, a flashlight, a strobe, and a camera flash.

12. The chamber of claim 8, wherein the slit opening is generally beveled.

\* \* \* \* \*